Aug. 4, 1942.  C. A. REIMSCHISSEL  2,291,758
THREAD CUTTING MECHANISM
Filed Aug. 3, 1940  3 Sheets-Sheet 1
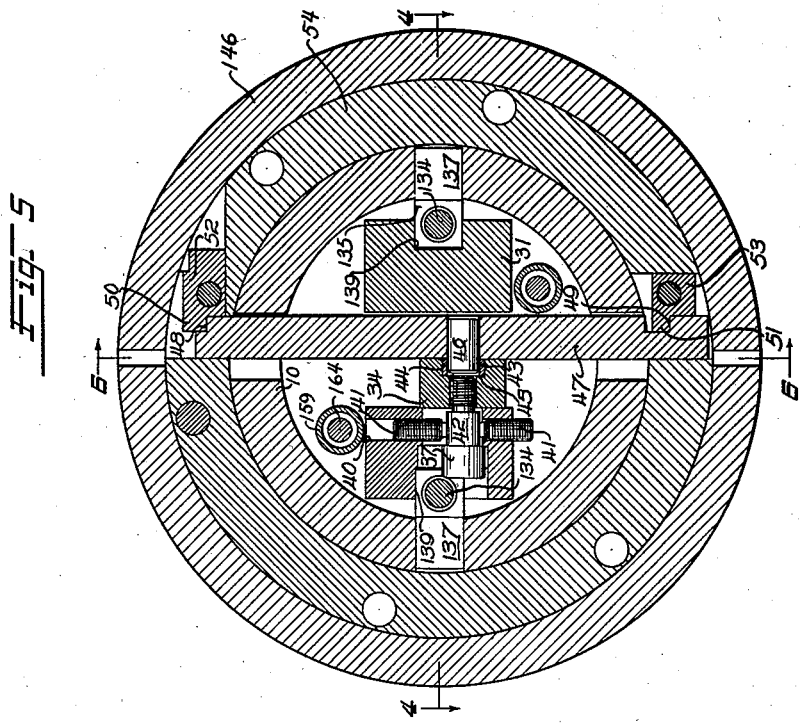
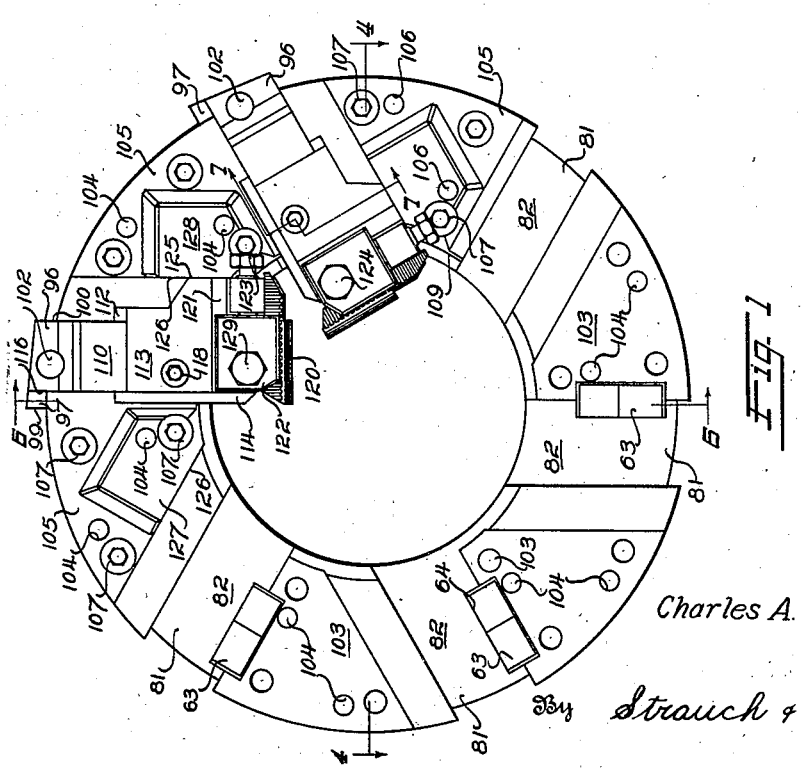
Inventor
Charles A. Reimschissel
By Strauch & Hoffman
Attorneys Aug. 4, 1942.   C. A. REIMSCHISSEL   2,291,758
THREAD CUTTING MECHANISM
Filed Aug. 3, 1940   3 Sheets-Sheet 2

Inventor
Charles A. Reimschissel

By Strauch & Hoffman
Attorneys

Aug. 4, 1942.   C. A. REIMSCHISSEL   2,291,758
THREAD CUTTING MECHANISM
Filed Aug. 3, 1940   3 Sheets-Sheet 3

Inventor
Charles A. Reimschissel
Strauch & Hoffman
Attorneys

Patented Aug. 4, 1942

2,291,758

UNITED STATES PATENT OFFICE 2,291,758

THREAD CUTTING MECHANISM

Charles A. Reimschissel, Waynesboro, Pa., assignor to Landis Machine Company, Waynesboro, Pa., a corporation of Pennsylvania Application August 3, 1940, Serial No. 350,811

20 Claims. (Cl. 10—120.5)

This invention relates to a threading machine; more specifically, to a thread cutting machine especially adapted to cut tapered threads by employing cutting elements which experience radial retracting movement during the threading operation, and also are caused to retract, upon the completion of the threading operation, so that the work may be withdrawn without the necessity of "backing-off."

I have shown my invention in the form of a die head for cutting external threads. As such, it belongs in the same general class of machines as does that disclosed by Benninghoff in United States Patent 2,054,028 but it differs from that disclosure as later will be made evident. In a broad sense, both Benninghoff's and the present disclosure are basically related to British Patent No. 343,834, dated February 26, 1931; and United States Patents No. 1,811,802 to Newman and No. 1,391,639 to Koontz. The latter three disclosures are more specifically concerned with a machine for cutting internal threads, that is, a tap instead of a die head, but, as will hereinafter become apparent, the several novel features of my present invention generally can be incorporated into either a tap or a die head structure; consequently, the use of the terms "threading machine" and "thread cutting machine" is not meant to be restricted solely to a die head structure.

Koontz was the first to disclose a threading machine having a taper mechanism employing a transverse member coacting with a work abutting mechanism to actuate a chaser controlling mechanism. The Newman disclosure constituted a considerable improvement over Koontz in that the camming action was made more positive and a choice of two tapers was provided.

The disclosures of the British patent and Benninghoff Patent No. 2,054,028 constituted detailed improvements over the Koontz and Newman patents by providing a separate latch, automatically actuated at the end of the thread cutting operation, so that the parts of the taper producing mechanism could be maintained in cooperative engagement throughout thread cutting and also during chaser retraction, the result being accomplished in the same way in each patent, but by slightly different, but equivalent, means. In the British patent a pivoted latch is used and the taper train is made up of either coacting screw threaded members or a lever mechanism, while in Benninghoff slidable latches are used and a transversely slidable cam bar, somewhat similar to that disclosed by Koontz and Newman, is employed to effect the receding action of the chasers to cut a tapered thread.

All of the prior constructions discussed are open to the objections that they cannot be adjusted by small increments to secure a multiplicity of tapers; those that employ a transverse cam bar do not provide sufficient stability of the bar during all phases of operation to insure extreme accuracy of thread cutting at all times, because of the failure to secure a positive tapering action; due to the design of their latch mechanisms they cannot be employed to cut long thread lengths without resulting in a unit of correspondingly great length; and because of the manner in which the cutter assemblies are mounted in the head, the forces developed during thread cutting, especially when a hard spot in the work is encountered, often so distort the holders as to impair the accuracy of the thread.

Accordingly, a major object of my invention is to provide a novel threading machine which is less complex and costly, but yet more durable, more accurate and more flexible than the machines of the prior art and having a taper mechanism operating in balanced camming contact between the work abutting unit and the chaser actuating unit thereof and embodying a taper adjustment for effecting taper changes by infinitely small increments within a continuous taper range.

A further object is to provide a novel arrangement to stabilize the transverse camming bar, so that it will effect a more positive tapering action and will, consequently, result in producing a more accurate and smoother thread.

Another object is to provide novel means for supporting the chaser slides within the die head body and adapted to better resist the cutting reactions acting longitudinally of the cutting elements, and also having novel means for simultaneously adequately opposing the cutting forces acting on chaser assemblies.

Another object is to provide a novel trip mechanism incorporating a tripping member adapted to move with respect to the work abutting mechanism and to then be picked up and actuate the latch mechanism, so that the machine may cut relatively long thread lengths, and yet be of relatively short length.

It is a further object to provide a duel springing arrangement wherein one group of springs serves to effect the collapsing of the chasers, and the other group of springs is utilized to aid in resetting the mechanism and to further assist in stabilizing the operation of the taper producing mechanism.

Other subordinate, but yet important objects are to provide novel means for effecting a change of chaser slides, and for changing the diametrical range of the die head, without dismantling the machine; to provide large area bearing surfaces to minimize wear; to provide positive acting means to maintain the desired diametrical adjustment; to provide an improved type of latching mechanism; to provide a more rigid work abutting assembly; and to provide other novel features which will become apparent as the specification proceeds in conjunction with the annexed drawings, and from the appended claims.

In the drawings,

Figure 1 is a face view of a die head embodying a preferred form of the invention, several of the chaser assemblies and coacting chaser assembly slides, together with several of the gibs, being removed to show the configuration of the face of the head and the character of the slideways coacting with the chaser assembly slides;

Figure 5 is a transverse section taken along line 5—5 of Figure 4 and showing details of the taper adjustment mechanism and manner in which it coacts with the transverse camming bar;

Figure 6:
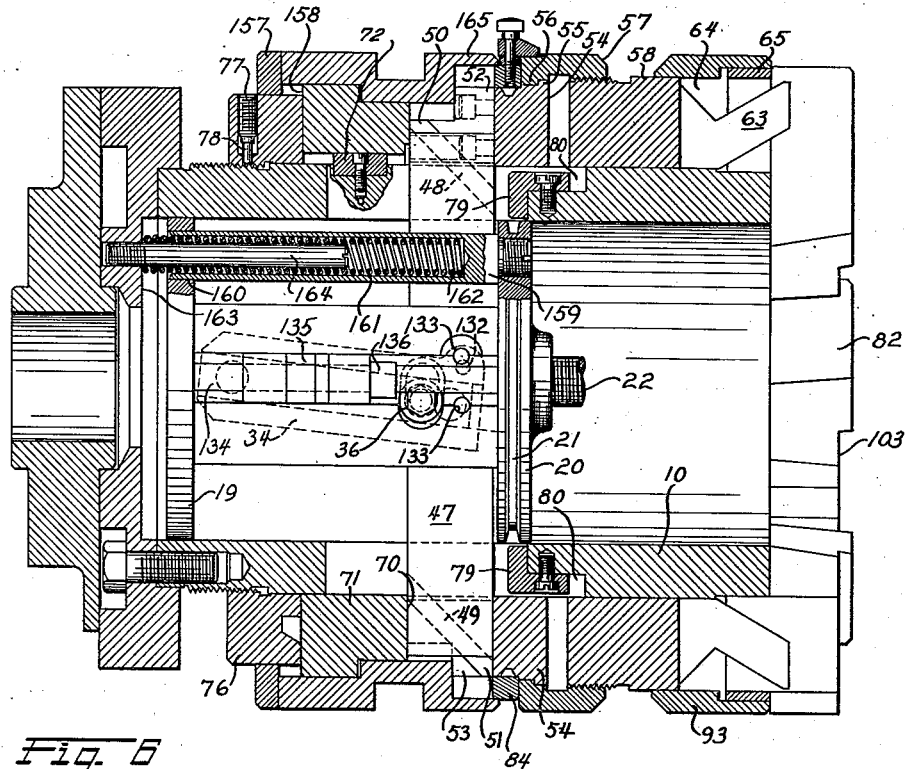
Figures 2, 7:
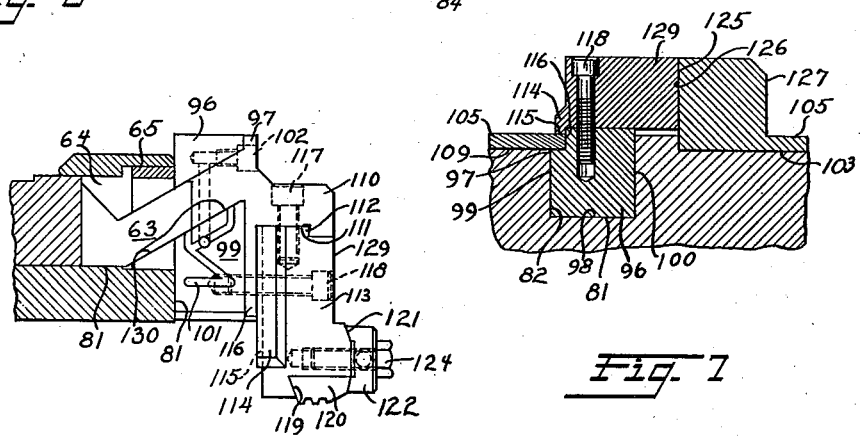
Figure 2 is a fragmental longitudinal sectional view through the head adjacent one of the guideways, showing further details of one of the chaser assemblies and its coacting slide, and of the means for actuating the slide in its slideway.
Figures 3, 4:
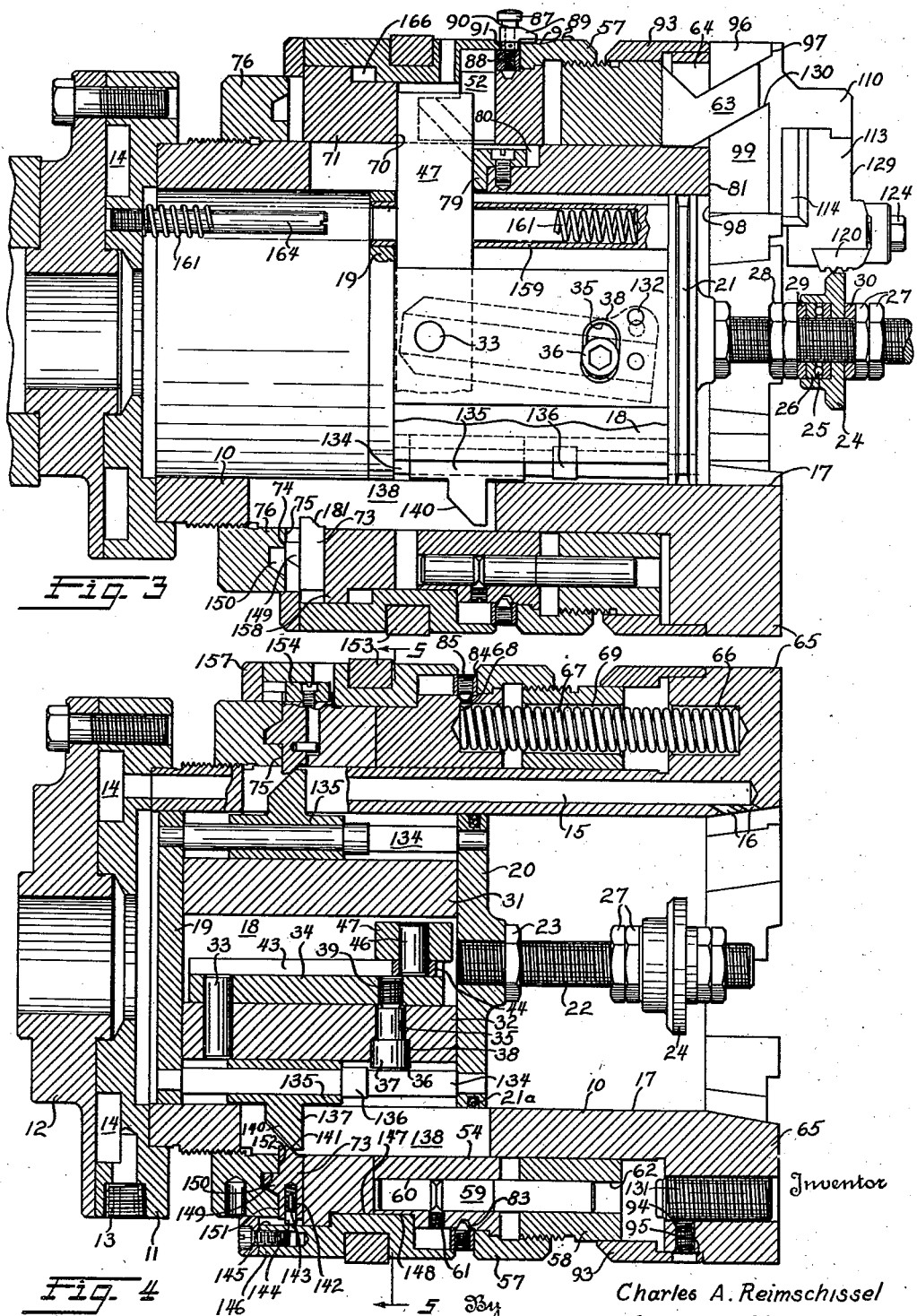
Figure 3 is primarily a longitudinal section showing the parts in thread cutting position; however, the pilot assembly is shown essentially in elevation, certain of its components being shown displaced from their actual positions, so as to better reveal their structure and manner of operation.
Figure 4 is a longitudinal sectional view taken along the line 4—4 of Figures 1 and 5, and showing the parts in collapsed position.

Figure 6 is a longitudinal section taken along line 6—6 of Figures 1 and 5, and shows the parts in collapsed position, this section being substantially at right angles to that of Figure 4, and Figure 7 is a fragmental sectional view taken substantially on the line 7—7 of Figure 1, showing the manner in which the slide cooperates with the guideway and the chaser holder.

With continued reference to the drawings, wherein like reference characters have been employed to designate like parts throughout the several views thereof, and referring more particularly to Figures 3, 4, 5 and 6 the machine embodies a die head body 10 which has bolted to the rear end thereof an intermediate attaching flange 11. Flange 11 is in turn bolted to an element 12, which serves to adapt the die head for mounting on some form of threading machine. The flange is provided with a threaded recess 13 to which may be connected a pipe carrying cutting coolant. Connecting with the recess 13 is an annular recess 14 which directs the coolant into a plurality of longitudinal bores 15 formed in head body 10. Head body 10 also has a plurality of orifices 16 which connect with the bores 15 and serve to direct the coolant onto the work being threaded, as will be understood by those skilled in the art.

A plurality of chaser assemblies are mounted for inward and outward movement on the head, and they are caused to be retracted during the threading operation to cut a tapered thread. The novel receding or taper mechanism will be described first.

Receding mechanism

Within bore 17 of head body 10, there is mounted, for axial movement, a pilot assembly 18 having a rear circular plate 19 and a front circular plate 20 axially spaced therefrom. Front plate 20 incorporates an annular groove 21 which is adapted to receive a felt ring 21a (not shown in Figures 3 and 6) that serves to seal the interior of the die head against foreign matter and which lubricates the bore 17 of head body 10. Also, front plate 20 has threadably attached thereto a stud member 22 which is locked in position by locking nut 23. A cylindrical work abutting member 24 is rotatably mounted on stud 22, bearing against a thrust bearing 25 located within a bore 26 and properly positioned with respect to the front face of plate 20 by means of a pair of locking nuts 27 and 28, and washers 29 and 30, respectively. This unit is utilized to effect thread length changes, as will later be made evident.

A pair of bar-like members 31 and 32 are attached to pilot plates 19 and 20 by means of cap screws (not shown) and serve as spacing and connecting elements therefor. Member 32 has a pin 33 fastened therein and forming a pivot about which a sine bar 34 is adapted to rock. Member 32 also is provided with an arcuate counterbored recess 35, whose center of curvature coincides with the center of the pivot pin 33. A screw 36 is located within the recess 35, and head 37 thereof bears against the counterbored surface 38 of recess 35. This screw is adapted to engage a threaded bore 39 in sine bar 34, so that the sine bar may be clamped to member 32 in any of a plurality of angular positions. Member 32 is further provided with a threaded bore 40 which intersects recess 35 and in which are located a pair of opposed set screws 41 that abut the shank 42 of screw 36. Screws 41 are utilized to effect angular adjustment of sine bar 34, and to assist the clamping screw 36 in preventing any undesired variation of the established angular position thereof after the parts are locked in adjusted position.

Sine bar 34 also has a longitudinal groove 43, in which is slidably mounted a block 44 having a bore 45 adapted to receive a pin 46, which is secured in a transverse camming bar 47. The cam bar is mounted for both transverse and longitudinal movement in head body 10, and from the structure so far developed it is apparent that when the pilot assembly is moved from the position shown in Figure 3 to the position shown in Figure 6 bar 47 is depressed, due to the action of block 44 sliding in groove 43. Also by adjusting the inclination of bar 34 the rate of travel of the cam bar may be varied.

Cam bar 47 is provided with an inclined cam groove 48 in its upper end and a similar inclined cam groove 49 in its lower end. These cam grooves respectively coact with cam tongues 50 and 51 integrally formed with respective cam members 52 and 53, the latter being attached by means of screws to a cam ring 54 that is slidably mounted outside the die head body 10.

The cam ring also has an annular shoulder 55 against which an annular shoulder 56 of an adjusting ring 57 is adapted to abut. The adjusting ring is threadedly connected to a closing ring 58, and serves as an adjustable length connector or spacing means between cam ring 54 and the closing ring. Rings 54 and 58 are keyed together by a plurality of rod-like keys 59, each of which is mounted in a bore 60 located in cam ring 54, and retained therein by a cone-headed set screw 61 fastened in cam ring 54 and contacting an annular groove in each key. Keys 59 are slidable within bores 62 formed in closing ring 58.

Closing ring 58 is provided with a plurality of camming prongs 63 which key it to the head body 10 by engaging recesses 64 (see Figure 1) provided therefor in an enlarged forward portion 65 of head body 10. Thus, in effect, both the closing ring 58 and the cam ring 54 are keyed to the head body, and freely axially slidable thereupon.

The enlarged forward portion of head body 10 is provided with a plurality of counterbores 66 in which are located the die head opening springs 67. These springs coact with similar counterbores 68 provided in cam ring 54, and they pass through suitable holes 69 in closing ring 58, so as to constantly urge cam ring 54 rearwardly. To normally restrain the cam ring from moving rearwardly under the influence of springs 67, bar 47, which seats in transverse slots therein, is designed to abut the annular end surface 70 of a latch ring 71, which is also slidably mounted on body 10, being keyed thereto by a longitudinal key 72. A plurality of radially slidable latch members 73 are mounted for radial sliding movement in slots in ring 71, and have adapted latch faces 74 accepted to cooperate with a latch surface 75 of an abutment or locking ring 76 (see Figure 3). The latter is threaded upon the head body and adapted to be locked in position thereon by a locking screw 77 carried by ring 76 and designed to force a soft metal plug 78 into locking engagement with the threaded portion of the head body.

During the initial assembly of the machine, the locking ring is adjusted on head body 10 so that the bar 47 abuts a pair of hardened supporting members 79 (see Figure 3) which are detachably mounted in recesses 80 in the head body, and function to stop forward travel of the parts during the resetting operation. Thus, as long as the latch faces 74 contact the latch surface 75, lever 47 is precisely fixed relative to the base surface 81 of each of a plurality of slideways 82 located in the forward body portion 65. This follows since the lever 47 snugly contacts both the supporting members 79 and the annular surface 70 of latch ring 71.

Rings 54, 57 and 58 accordingly make up the chaser controlling unit of my taper mechanism. To make this unit as rigid as possible, cam ring 54 is provided with a peripheral groove 83 and overlying the groove is a retaining ring 84 having screws 85 whose points coact with the groove 83 to force the retaining ring tightly against the end surface of adjusting ring 57, even after some wear of this surface has been experienced. Further, to maintain the desired adjustment between adjusting ring 57 and closing ring 58, a diametrical adjustment locking device is employed. This device comprises a thumb screw 87 threaded into a coacting threaded bore 88 of retaining ring 84 and having a key member 89 rotatably mounted on the shank thereof between a head portion 90 and a collar 91, the key member 89 being adapted to engage any one of a plurality of serrations 92 formed on the periphery of adjusting ring 57. Finally, to minimize wearing of this ring unit, a sealing ring 93 is mounted on the periphery of closing ring 58 and is secured by screws 94 to a coacting annular recess 95 formed in the periphery of the forward body portion 65. Thus, as the closing ring 58 experiences axial movement, sealing ring 93 serves at all times to exclude foreign matter from the interior of the ring assembly.

*Chaser assembly*

The novel chaser-holder and slide assemblies will now be described. As previously described, each of the camming prongs of closing ring 58 extends through a recess in the enlarged forward portion of head body 10. Each recess 64 terminates at the base surface 81 of the respective slideway 82 located in forward body portion 65. As seen in Figure 1, the longitudinal axis of every slideway approximates a radial relationship. Referring more particularly to Figures 1, 2 and 7, slidably mounted within slideways 82 is a plurality of chaser assembly slides 96 of approximate rectangular bar form, (see Figures 1, 2 and 7), one of the corners being recessed to provide a narrow surface 97 offset from, but parallel to, the base surface 98 of the slide. Vertical slide surfaces 99 and 100 of slide member 96 incorporate a series of similar oil grooves 101 which are fed from an oiler 102 mounted in the rear portion of the slide. This oiling arrangement minimizes any tendency for the slide to bind within its slideway.

Referring more particularly to Figures 1 and 7, the face of head body 10 has a number of recesses 103, one adjacent to each slideway 82. Recesses 103 are provided with locating pins 104, which are employed to position a plurality of gib members or plates 105, and which fit into plates 105. Clamping screws 107 serve to securely fasten the gibs within their respective recesses. Each gib further incorporates a leading edge which overhangs its adjacent slideway 82.

Since all of the gibs 105, slideways 82, and chaser assembly slides 96 are identical and cooperate in identical fashion, the present description will be confined to but one such cooperating assembly. In assembled position, the under surface of the leading edge of the gib plate contacts offset surface 97 of slide 96, and thereby functions to maintain the slide in bearing contact with the bottom surface 81 of slideway 82. By initially proportioning the parts so that shims (not shown) are provided in the gib recess 103, it is possible to retain the slide within its slideway with proper sliding clearance in spite of wear of these units, for the removal of several thicknesses of shim stock (not shown) will again bring gib surface into contact with slide surface 97.

Slide 96 is provided with an integral rear lug 110 (best shown in Figure 2) having a transverse groove 111 adapted to receive the coacting end 112 of chaser holder 113. The holder has an integral longitudinal ledge 114 whose depending portion 115 slidingly abuts a vertical surface 116 on slide 96. A clamping screw 117 is utilized to draw holder end 112 into firm contact with the transverse groove 111 of slide lug 110, and a screw 118 is utilized to clamp the holder 113 firmly on top of slide 96, ledge 114 precluding relative rotation between the holder and slide. Lug 110 forms a hooked portion or pocket for the end of the holder so that, when screw 117 is threaded home, the parts are extremely rigidly united, and cannot rock or slide with respect to each other.

Holder 113 has a recess 119 in which is mounted a tangential chaser 120, and a beveled surface 121 for receiving a chaser clamp 122, but it is to be understood that any other suitable forms of chaser and clamps may be used. Also, the chasers shown are designed to cut an external thread, but if desired chasers designed to cut an internal thread may be used without departing from the spirit of the invention.

The chaser and clamp are interlocked by serrations carried on their clamping surfaces. They may be adjusted, as a unit, relative to holder 113, by turning an adjusting screw 123, threaded into a lug on the holder and abutting the clamp. After adjustment, a screw 124 threaded into the holder securely locks the clamp and chaser to the holder. The chaser assembly and clamp just described are disclosed in detail in my United States Reissue Patent 20,930, and since no claim is made thereto in this application it will not be further described.

Slide lug 116 is especially adapted to resist the radially directed cutting thrust developed in the chaser during threading. For the purpose of resisting the tangential or longitudinal cutting thrust acting along the longitudinal axis of the chaser, holder surface 125 abuts the vertical surface 126 of a lug 127, which is formed integral with each gib 105, the lug being approximately a truncated pyramid whose top surface 128 is practically level with the top surface 129 of holder 113. Holder surface 125 is relieved, toward the rear of the holder, so that the center of the bearing area thereof with gib lug surface 126 more nearly coincides with the line of application of the longitudinal cutting thrust. The thrust resisting features just discussed are extremely important, especially when the device is employed to cut threads of most exacting specifications, since any appreciable distortion of the parts would result in an imperfect thread. Broad aspects of the thrust resisting features just discussed are disclosed and claimed in the co-pending application of Frederic Nell, for "Thread Cutting Mechanism", Serial No. 413,029, filed September 30, 1941.

*Operation*

Referring more particularly to Figure 3, the manner in which the die head is employed to cut a tapered thread will now be described. Generally, the head is not rotated, being moved axially forward with respect to the work, which rotates with respect thereto at a synchronized speed. The end of the work contacts work abutting member 24 just before chasers 120 start to cut. Thereafter, as the head is fed forwardly the pilot assembly experiences a relative rearward movement within the head body. This rearward movement of the pilot assembly effects a proportionate downward movement of the bar 47, for the latter has camming contact with the sine bar carried by pilot assembly 18.

The camming contacts of lever 47 with cam ring 54 serve to move that ring rearwardly of head body 10 as the lever is depressed. Since the closing ring 58 is connected to the cam ring 54 by the adjusting ring 57, the rearward movement of cam ring 54 causes closing ring 58 to experience a similar rearward movement. Consequently, closing ring prongs 63 coact with camming recesses 130 of slides 96 to move the slides and chasers mounted thereon radially outward. The combined synchronized radial movement of the chasers, axial movement of the die head, and rotary movement of the work results in producing a tapered thread whose accuracy is greatly enhanced by virtue of the rigidity of the pilot assembly, cam bar, and outer ring or chaser controlling assembly, and by reason of the balanced upper and lower camming contacts of the lever with the outer ring assembly and of the cutting thrust balancing properties of the slide, slideway, chaser holder, and gib arrangement.

Should a slight diametrical adjustment be necessary, closing ring 58 may be adjusted longitudinally with respect to cam ring 54 by adjusting ring 57. This causes closing ring prongs 63 to have a different initial engagement with slide recesses 130. A stop 131, threaded in head body portion 65 limits the forward movement of closing ring 58 to avoid extreme engagement of prongs 63 with recesses 130. This stop also establishes the smallest diameter which can be cut with a particular set of slides 96. Major diametrical changes are effected by using a set of different length slides, as later will be discussed.

To change the rate of tapering, sine bar 34 is pivoted into the required angular position or inclination with respect to pilot assembly 17. This results in having lever 47 experience a faster or slower transverse movement. Sine bar 34 may further be provided with a series of holes 132, each of which is adapted to index with a coacting hole 133 in member 32 so that a pin may be inserted in the coacting indexed holes to set the bar for some commonly used taper.

Although the range of sine bar adjustability is large, if the desired taper is outside the range, a different lever 47, having differently inclined camming contacts with cam ring 54, may be substituted. This substitution provides an entirely new range of possible tapers. To cut a straight thread, I prefer to utilize a camming lever 47 having vertical camming contacts with the cam ring 54; thus transverse motion of the lever will not affect the position of the outer ring or chaser controlling assembly mounted around the head body 10. However, straight threads may also be cut by adjusting sine bar 34 so that longitudinal recess 43 is parallel to the axis of the die head, and longitudinal movement of the pilot assembly does not result in movement of the cam bar.

When a thread of predetermined length has been cut, the latches are automatically tripped to collapse the die, as will now be described. Pilot assembly 18 is provided with a plurality of trip rods 134, which are mounted between plates 19 and 20. A trip member 135 is slidably mounted on each rod, being adapted to be engaged by a collar 136. The trip members have lugs 137 which coact with longitudinal recesses 138 in head body 10, and with grooves 139 in bars 31 and 32 to key the pilot assembly against rotation relative to the head body. Thus the bar 47 is free from any keying functions which might cause it to bind and thereby affect its operation.

As the threading operation draws to completion, collars 136 engage trips 135, moving them rearwardly, and their camming faces 140 contact camming faces 141 on the latches 73 and move the latches radially outward, against the force of a pair of latch springs 142 mounted in bores 143 in the latches and pressing against cylindrical plugs 144 that contact the annular surface 145 of an operating ring 146. The latter is mounted for limited longitudinal movement in an annular recess 147 provided in latch ring 71, and cam ring 54. Inward movement of latches 73 is limited by a pin sliding in a slot in ring 71 (Figure 4). Sufficient radial outward movement of latches 73 causes their latch faces 74 to lose contact with latch surfaces 75 of locking ring 76, the latch member abutments 149 then being aligned with an annular recess 150 provided in locking ring 76. When this occurs, the die head opening springs force cam ring 54 and latch ring 71 rearwardly until the end surface 151 of latch ring 71 contacts end surface 152 of locking ring 76. At the same time, the closing ring 58 is moved rearwardly; thus, camming prongs 63 thereof cause slides 96 to move radially outward and thereby release the chasers from the work. The die head now is in collapsed position as seen in Figures 4 and 6.

The initial axial distance between collars 136 of trip rods 134, and the latches 73 determines the length of thread; consequently, the adjustability of work abutting member 24 with respect to the collars 136, as effected by the stud member 22 and locking nuts 27 and 28, comprises an adjustable thread length determining feature. The die head structure may be made shorter by virtue of the fact that the trips 135 do not experience the same length of axial movement as the remainder of the pilot assembly 18; thus, the head may be applied to machines which otherwise could not utilize it.

To reset the die head to its original threading position, a yoke mechanism (not shown) coacts with a yoke ring 153 received in an annular recess provided in operating ring 146, to move the operating ring axially forward, the latter being keyed to latch ring 71 by a key member 154, so as to be axially movable but non-rotatable with respect to head body 10. Operating ring 146, when moved forwardly, produces a similar movement of cam ring 54, which compresses opening springs 67 and moves closing ring 58 forwardly to move the chaser assemblies inwardly to cutting position. Before the operation just described is completed, however, an annular plate 157, which is attached to operating ring 146, coacts with the shoulder 158 on latch ring 71 to move that ring forwardly into the position shown in Figure 3, so that the latches may slide inwardly to latched position under the influence of springs 142.

Since the sole connection between the cam ring and the pilot occurs at sine bar groove 43, and the parts would be subjected to excessive stresses if this connection were relied upon to return the pilot, I preferably provide the pilot assembly 18 with a plurality of tubular members 159, threaded into the front plate 20, and mounted in bores 160 of rear pilot plate 19. Members 159 contain resetting springs 161, which act against the surfaces 162 thereof and the end surface 163 of flange 11 of the body and centering rods 164 are threaded into flange 11 and extend through springs 161. These springs further serve to stabilize the pilot assembly during the threading operation by acting as a cushioning means against detrimental vibrations.

Accordingly, when ring 146 is moved forwardly to restore the parts to cutting position as previously described, springs 161, which are constantly exerting a "follow up" action upon the pilot, move the pilot forwardly in accordance with, but at a greater rate than, cam ring 54, so that when ring 54 has been returned to the position shown in Figure 3, the pilot will also assume the position shown in that figure. It is to be understood that the different positions of member 24 assumed in Figures 3 and 4 merely illustrate two adjusted positions thereof.

By providing operating ring 146 with an integral annular ledge 165, enclosing the periphery of retaining ring 84, the camming contacts of the lever 47 with the cam ring 54 are sealed against the possible entry of foreign matter. Further, operating ring 146 incorporates a bore 166 adapted to receive an oiler (not shown) which functions to lubricate the camming contacts and the working surfaces of the pilot assembly 18.

Another advantageous feature of my die head is the ease with which major diametrical changes can be made. As has been stated before, such changes are effected by employing a different set of slides 96 of longer or shorter length. To remove the old slides 96, it merely is necessary to adjust the head to its maximum diameter by rotating ring 57, and then to back off locking ring 76. The maximum diameter adjustment causes prongs 63 to have their least engagement with slide recesses 130 and the permissible rearward movement of locking ring 76 then is more than sufficient to permit the prongs 63 to disengage from the slides 96. The new set of slides 96 now is placed in slideways 82; locking ring 76 is again threaded back to its original position; and the head adjusted for any desired diameter, within the range of the new set of slides. Such diametrical changes necessitate the use of a corresponding proper diameter work abutting member 24.

As previously pointed out, the chasers may be designed to cut either an internal or an external thread, and it is to be understood that the foregoing disclosure of a die head is not to be deemed as limiting the invention thereto, because, by reversing the parts so that the chasers undergo an inward, rather than an outward retracting or receding movement during the threading operation the machine would constitute a tap rather than a die head; and the term retracting, as employed in the appended claims, is intended to apply to the outward movement of the chasers when the invention is embodied in a die head and the inward movement of the chasers when the invention is embodied in a tap.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a threading machine, a head body having inwardly and outwardly movable thread cutters; a longitudinally movable member for controlling said cutters; a transversely slidable bar having balanced camming engagement at its ends with spaced portions of said member; inclined cam means for sliding said bar and retracting said cutters as the threading operation proceeds, so as to cut a tapered thread; and means for adjusting the inclination of said cam means by small increments to vary the rate of taper.

2. In a threading machine, a head body having inwardly and outwardly movable thread cutters; a longitudinally movable member for controlling said cutters; a transversely slidable bar having camming engagement with two substantially diametrically opposite portions of said member; inclined cam means mounted for longitudinal sliding movement in said body for sliding said bar and retracting said cutters as the threading operation proceeds, so as to cut a tapered thread; and means for adjusting said cam means by small increments into various inclinations to vary the rate of taper.

3. In a threading apparatus, a hollow head body having movable thread cutters; a transversely slidable cam bar for controlling said cutters; a longitudinally slidable taper mechanism in said body for actuating said cam bar, comprising an inclined member cooperating in camming engagement with the mid-portion of said cam bar; means mounting said member for adjustment into various inclinations and also having means for locking it in any one of a plurality of inclined positions, whereby the rate of taper may be changed at will.

4. In a threading apparatus, a hollow head body having movable thread cutters; a transversely slidable cam bar for controlling said cutters; a longitudinally slidable taper mechanism in said body for actuating said cam bar, comprising an inclined member cooperating in camming engagement with said cam bar; said member being pivoted and having means for locking it in any one of a plurality of pivoted positions, whereby the inclination thereof, and the rate of taper, may be changed at will.

5. In a threading machine, a head body having a plurality of inwardly and outwardly movable cutters; a longitudinally movable ring assembly for controlling said cutters; a cam bar; means mounting said cam bar for both transverse and longitudinal movement in said head body and for camming movement in said ring assembly; stabilizing means carried by said body and slidably coacting with one edge of said cam bar; means for holding said cam bar with said one edge in engagement with said stabilizing means during the threading operation; and means for actuating said cam bar during the threading operation to produce a tapered thread.

6. In a threading machine, a head body having a plurality of inwardly and outwardly movable cutters; a longitudinally movable ring assembly for controlling said cutters; a cam bar mounted for both transverse and longitudinal movement in slots in said head body and for camming movement in slots in said ring assembly; means for holding said cam bar in engagement with the forward ends of the slots in said body, during the threading operation to stabilize the structure; and means for actuating said cam bar during the threading operation to produce a tapered thread.

7. In a threading machine, a head body having a plurality of inwardly and outwardly movable cutters; a longitudinally movable ring assembly for controlling said cutters; a cam bar mounted for both transverse and longitudinal movement in said head body and guided for camming movement in slots in said ring assembly, the slots in said ring assembly constituting the sole guiding means for said cam bar when the later is disposed out of thread cutting position; means for holding said cam bar in engagement with stabilizing means confining the bar to transverse movement during thread cutting; means for actuating said cam bar during the threading operation to produce a tapered thread; and means for releasing said cam bar from said stabilizing means and allowing said cam bar to move longitudinally and free the cutters from the work after a thread of predetermined length has been cut.

8. In a threading machine, a head body having inwardly and outwardly movable thread cutters; a longitudinally movable member for controlling said cutters; resilient means urging said member toward cutter collapsing position; a single longitudinally movable assembly adapted to be moved in accordance with the threading operation and embodying means for retracting said member and said cutters during the threading operation so as to cut a tapered thread; means for automatically collapsing said cutters after a predetermined length of thread has been cut; means, independent of said longitudinally movable assembly, for restoring said member to cutting position against the action of said resilient means; and resilient means for automatically restoring said longitudinally movable assembly to cutting position in response to restoration of said member to cutting position.

9. In a threading machine, a head body having inwardly and outwardly movable thread cutters; a longitudinally movable member for controlling said cutters; resilient means urging said member toward cutter collapsing position; a single longitudinally movable assembly disposed in said body adapted to be moved in accordance with the threading operation and embodying means for retracting said member and said cutters during the threading operation so as to cut a tapered thread; means for automatically collapsing said cutters after a predetermined length of thread has been cut; means for restoring said member to cutting position against the action of said resilient means; and resilient means acting against said longitudinally movable assembly and reacting against said body for restoring said assembly to cutting position substantially simultaneously with said member.

10. In a threading machine, a head body having inwardly and outwardly movable thread cutters; a longitudinally movable member for controlling said cutters; resilient means urging said member toward cutter collapsing position; a single longitudinally movable assembly disposed within said body adapted to be moved in accordance with the threading operation and embodying means for retracting said member and said cutters during the threading operation so as to cut a tapered thread; means for automatically collapsing said cutters after a predetermined length of thread has been cut; means, independent of said longitudinally movable assembly, for restoring said member to cutting position against the action of said resilient means; and resilient means acting against said assembly and reacting against said body for restoring said assembly to cutting position substantially simultaneously with or subsequent to restoration of said member to cutting position.

11. In a threading machine, a hollow head body; a ring mounted for longitudinal sliding movement on said body; an abutment ring located adjacent said movable ring and fixed against axial movement with respect to said body; resilient means urging said movable ring toward said abutment ring; a plurality of radially slidable latches mounted in one of said rings and having axially directed abutments cooperating with the other ring to maintain said movable ring spaced from said abutment ring against the action of said resilient means; and longitudinally movable means for simultaneously tripping said latches and allowing said movable ring to move toward said abutment ring under the influence of said resilient means.

12. In a threading machine, a head body carrying outwardly and inwardly movable thread cutters; a longitudinally movable member for controlling said cutters; taper means, including latch means for holding certain parts stationary during the threading operation, to retract said cutters during threading to produce a tapered thread; and means for tripping said latch to allow said abutment means to retract and release the cutters from the work after a predetermined length of thread has been cut, said last-named means having a lost-motion connection with the work, whereby it has an operative range of travel shorter than the relative travel between the head body and the work.

13. In a threading machine, a head body carrying outwardly and inwardly movable thread cutters; a longitudinally movable member for controlling said cutters; abutment means; latch means for holding said abutment means stationary during the threading operation; taper means reacting against said abutment means and operating on said member to retract said cutters during threading to produce a tapered thread; and means for tripping said latch to allow said abutment means to retract and release the cutters from the work after a predetermined length of thread has been cut, said last-named means having a lost motion connection with the work, whereby it has an operative range of travel shorter than the relative travel between the head body and the work.

14. In a threading machine, a head body carrying outwardly and inwardly movable thread cutters; a longitudinally movable member for controlling said cutters; abutment means; latch means for holding said abutment means stationary during the threading operation; taper means reacting against said abutment means and operating on said member to retract said cutters during threading to produce a tapered thread; an assembly adapted to contact the work and movable longitudinally in accordance with the threading operation; and means on said assembly for tripping said latch to allow said abutment means to retract and release the cutters from the work after a predetermined length of thread has been cut, said last-named means having a lost motion connection with said assembly, whereby it has an operative range of travel shorter than the relative travel between the head body and said assembly.

15. In a threading machine, a head body; a member longitudinally movable with respect to said body; a movable latch for locking said member against movement in one direction; an element longitudinally movable with respect to said body; a latch tripping device mounted for longitudinal movement with respect ot said element; and stop means on said element for causing said tripping device to be picked up after a predetermined range of movement thereof and brought into tripping engagement with said latch for freeing said member for movement in said one direction.

16. In a threading machine, a head body; a member longitudinally movable with respect to said body; a movable latch for locking said member against movement in one direction; an assembly longitudinally movable with respect to said body; a latch tripping device mounted for longitudinal movement with respect to said assembly; and stop means on said assembly for causing said tripping device to be picked up after a predetermined range of movement thereof and brought into tripping engagement with said latch, for freeing said member for movement in said one direction, said tripping device comprising a plurality of elements slidably associated with longitudinal grooves in said assembly and said head body, for precluding relative rotation therebetween.

17. In a threading machine, a head body; a member longitudinally movable with respect to said body; a plurality of movable latches for locking said member against movement in one direction; an assembly longitudinally movable with respect to said body and having a plurality of longitudinal rods; a latch tripping device mounted for longitudinal movement on each of said rods; and stop means on said rods for causing said tripping devices to be picked up after a predetermined range of movement thereof and brought into tripping engagement with said latches for freeing said member for movement in said one direction.

18. In a threading machine, a head body carrying inwardly and outwardly movable thread cutters; a longitudinally movable member slidable on the exterior of said head body for controlling said cutters; a mechanism slidable longitudinally internally of said body for effecting retraction of said cutters during the threading operation so as to cut a tapered thread, said mechanism comprising a pair of disc-like elements rigidly connected to each other in spaced apart relationship and cooperating in sealing relationship with a cylindrical wall of said body; and a transversely slidable cam bar carried by said body independently of said slidable mechanism and coacting with said longitudinally movable member.

19. In a threading machine, a head body having a plurality of inwardly and outwardly movable thread cutters thereon; a ring-like member mounted for longitudinal sliding movement on said body and having camming engagement with said cutters; a second ring-like member slidable on said body and having means for adjustably connecting it to said first member for shifting said member back and forth to move said chasers into operative and inoperative positions; stop means for arresting said first member after it has moved away from said cutters a predetermined distance to prevent it from losing camming engagement with said cutters; and means for adjusting said stop means so that said first member may be moved beyond said predetermined position and disengaged from said cutters.

20. In a threading machine, a cylindrical head body having a pair of substantially diametrically spaced longitudinally extending slots therein; a chaser controlling ring slidably mounted on said body; a transverse cam bar disposed in said slots and having camming engagement at its ends with spaced portions of said ring; a longitudinally movable assembly within said body having cam means for transversely sliding said cam bar, but being otherwise independent thereof; a second ring slidably mounted on said body and adapted to engage the rear edge of said cam bar; latch means for holding said second ring in such longitudinal position as to maintain the front edge of said cam bar in slidably abutting relationship to the front ends of the slots in the head body, whereby said cam bar is guided for accurate transverse sliding movement by said ring and said slots when said second ring is in latched position; and means for releasing said latch means to allow said cam bar to move away from the front ends of said slots and undergo a free floating movement.

CHARLES A. REIMSCHISSEL.